Patented Oct. 28, 1952

2,615,895

UNITED STATES PATENT OFFICE 2,615,895

3,5-DIIODO-4-PYRIDYLMERCAPTO-CARBOXYLIC ACIDS AND THEIR PREPARATION

Sydney Archer, Albany, N. Y., assignor to Sterling Drug Inc., New York, N. Y., a corporation of Delaware No Drawing. Application May 9, 1950, Serial No. 161,010

15 Claims. (Cl. 260—295)

My invention relates to compounds having the formula

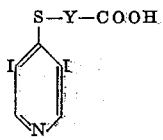

wherein Y is a divalent hydrocarbon bridge of from 4 to 7 carbon atoms, to water-soluble, non-toxic salts thereof, and to the preparation of these new substances.

I have found that these new compounds having this structure are opaque to X-rays and are useful as contrast media in roentgenological examinations of body structures and particularly of the gall-bladder.

The bridge Y, as a divalent hydrocarbon radical, can be an alkylene bridge including such radicals as propylmethylene

[—CH(CH₂CH₂CH₃)—]

isopropylmethylene [—CH(CH(CH₃)₂)—], 1,2-butylene [—CH₂CH(CH₂CH₃)—], 1,4 - butylene [—(CH₂)₄—], butylmethylene

[—CH(CH₂CH₂CH₂CH₃)—]

isobutylmethylene [—CH(CH₂CH(CH₃)₂)—], 1,3-pentylene [—CH₂CH₂CH(CH₂CH₃)—], 1,5-pentylene [—(CH₂)₅—], pentylmethylene

[—CH(CH₂CH₂CH₂CH₂CH₃)—]

isopentylmethylene

[—CH(CH₂CH₂CH(CH₃)₂)—]

1,6-hexylene [—(CH₂)₆—], hexylmethylene

[—CH(CH₂CH₂CH₂CH₂CH₂CH₃)—]

isohexylmethylene

[—CH(CH₂CH₂CH₂CH(CH₃)₂)—]

and 1,7-heptylene [—(CH₂)₇—]. Y can also be an arylene bridge including such radicals as 1,2-phenylene; 1,3- phenylene; 1,4-phenylene, 4-methyl-1,2-phenylene and —CH₂C₆H₄—. Y can also be a cyclic substituted alkylene bridge, including such radicals as cyclohexylmethylene, cyclopentylmethylene, cyclopentylethylene, and phenylmethylene. The radical Y can also contain ethylenic or acetylenic unsaturated linkages, including such radicals as butenylene (—CH₂CH=CHCH₂—)

hexenylene (—CH₂CH₂CH=CHCH₂CH₂—) and pentynylene (—CH₂C≡CCH₂CH₂—). Those compounds in which the radical Y has 4 to 7 carbon atoms are particularly efficient as gall-bladder contrast agents. If Y has fewer than 4 carbon atoms, an increasing tendency to pass through the kidneys is observed, so that lower homologs are not useful as cholecystographic agents. On the other hand, the presence of more than 7 carbon atoms in Y decreases absorption of the compound to such an extent that the compound passes through the gut unabsorbed. Hence, the carbon content of the radical Y is a critical feature, although the specific structure of Y otherwise is not critical.

These compounds can also be used in the form of water-soluble salts derived from therapeutically acceptable bases or acids. The possible salts fall into two categories: (1) Those obtained by neutralization of the carboxyl group with such inorganic and organic bases as sodium hydroxide, potassium hydroxide, ammonium hydroxide; and primary, secondary and tertiary amines and alkanolamines, including methylamine, dimethylamine, triethylamine, diethanolamine, triethanolamine, ethanol-diethylamine, piperidine and morpholine. The sodium, potassium, ammonium, methylamine, etc. salts are produced respectively. (2) Those obtained by addition of strong acids to the basic nitrogen of the pyridine ring. These acid-addition salts are derived from such strong mineral acids as hydrochloric acid hydrobromic acid, hydriodic acid, sulfuric acid, and nitric acid, and from such strong organic acids as benzenesulfonic acid, methanesulfonic acid and p-toluenesulfonic acid. The hydrochloride, hydrobromide, hydriodide, sulfate (or bisulfate), nitrate, benzenesulfonate, methanesulfonate and p-toluenesulfonate are respectively obtained.

My new compounds are prepared by reacting under alkaline conditions a pyridine derivative having the formula

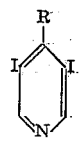

with a carboxylic acid having the formula R'—Y—COOH wherein one of R and R' is halogen and the other of R and R' is the thiol group, —SH. The reaction therefore has two variations. A salt of 3,5-diiodo-4-pyridinethiol can be caused to react with a salt of a halogenated carboxylic acid, preferably a chloro- or bromocarboxylic acid, viz

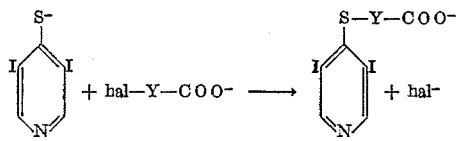

Or, a salt of a thiol-carboxylic acid can be caused to react with a 3,5-diiodo-4-halopyridine, viz

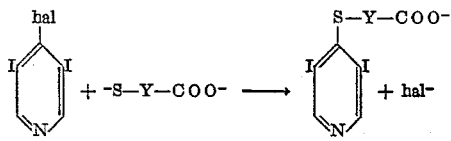

The iodine atoms in the 3- and 5-positions are too inert to enter into the reaction. The halogen atom in the 4-position is relatively labile and can be a chlorine, bromine or iodine atom, preferably chlorine or bromine.

If the reaction of 3,5-diiodo-4-pyridinethiol with a halogenated carboxylic acid is used, it is conveniently carried out in aqueous alkaline solution such as sodium hydroxide or potassium hydroxide. Both the pyridinethiol and the carboxylic acid are soluble in alkali and a homogeneous reaction mixture is formed. After completion of the reaction by heating, the mixture is acidified to precipitate the crude acid product. For acidification any strong or moderately strong mineral acid may be used provided it is not used in too large an excess to form an acid-addition salt. It is convenient to acidify the mixture by bubbling in sulfur dioxide, whereby any large excess of sulfur dioxide escapes. The sulfur dioxide also serves to decolorize the mixture by reducing any free iodine present. The crude product is then filtered and purified by recrystallization.

If the reaction of a 3,5-diiodo-4-halopyridine and a thiol-carboxylic acid is used, it is preferred to carry it out in a medium which is essentially non-aqueous because the 3,5-diiodo-4-halopyridine is insoluble in aqueous alkali. This is conveniently accomplished by using as the alkaline medium a solution of a sodium alkoxide, prepared, for example, by dissolving sodium in absolute ethyl alcohol. This method, however, is susceptible to the formation of by-products at the expense of the desired product, and its use is recommended only when the starting materials are more readily available than in the pyridinethiol-halocarboxylic acid method, or in situations where the halogen atom of the halocarboxylic acid is rather inert as in a halobenzoic acid.

The following examples will illustrate my invention more fully, but should not be construed as limitative.

EXAMPLE 1

Alpha-(3,5-diiodo-4-pyridylmercapto) valeric acid

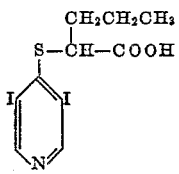

A solution of 18.0 g. (0.05 m.) of 3,5-diiodo-4-pyridinethiol and 9.0 g. (0.05 m.) of alpha-bromovaleric acid in 100 ml. of 1 N sodium hydroxide was heated for two hours on a steam bath at 90° C. The mixture was then cooled, sulfur dioxide was bubbled through the mixture until acid, and the resulting yellow precipitate was filtered, washed with water and dried. The crude product was recrystallized from dilute ethanol to give 17.0 g. of crystalline material which was dissolved in 250 ml. of toluene, and filtered. The filtrate was diluted with low-boiling petroleum ether and cooled to 0° C. The resulting crystalline precipitate was filtered and dried to give 12 g. of alpha-(3,5-diiodo-4-pyridylmercapto) valeric acid, M. P. 152.5-153.5° C.

Anal. calcd. for $C_{10}H_{11}O_2NI_2S$: I, 54.93; S, 6.92. Found: I, 55.20; S, 7.20.

EXAMPLE 2

Alpha-(3,5-diiodo-4-pyridylmercapto) caproic acid

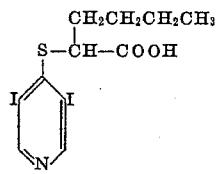

was prepared by a method similar to that described in Example 1, using alpha-bromocaproic acid and 3,5-diiodo-4-pyridinethiol as the starting materials. The crude product was recrystallized first from dilute ethanol and then from benzene-petroleum ether, and dried at 55° C. for 72 hours to give alpha-(3,5-diiodo-4-pyridylmercapto) caproic acid, M. P. 155-156° C.

Anal. calcd. for $C_{11}H_{13}O_2NI_2S$: I, 53.10; S, 6.90. Found: I, 53.20; S, 6.70.

EXAMPLE 3

Alpha-(3,5-diiodo-4-pyridylmercapto) isoenanthic acid

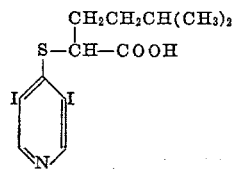

A solution of 18.0 g. (0.05 m.) of 3,5-diiodo-4-pyridinethiol and 10.5 g. (0.05 m.) of alpha-bromoisoenanthic acid in 50 ml. (0.1 m.) of 3 N potassium hydroxide was heated for two hours on a steam bath. The mixture was then poured into ice water, filtered, and sulfur dioxide was bubbled in until acid. The yellow crystalline precipitate was recrystallized twice from a benzene-petroleum ether mixture and dried at 55° C., giving 13 g. of alpha-(3,5-diiodo-4-pyridylmercapto) isoenanthic acid, M. P. 130-132° C.

Anal. calcd. for $C_{12}H_{15}O_2NI_2S$: I, 51.68; S, 6.53. Found: I, 51.25; S, 6.67.

Similarly by the method of Example 1, the reaction of alpha-bromophenylacetic acid and 3,5-diiodo-4-pyridinethiol gives alpha-(3,5-diiodo-4-pyridylmercapto) phenylacetic acid having the formula

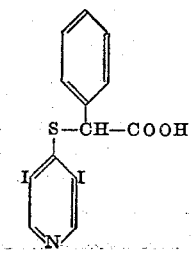

The reaction of alpha-bromocyclohexaneacetic acid and 3,5-diiodo-4-pyridinethiol gives alpha-(3,5 - diiodo - 4 - pyridylmercapto)cyclohexaneacetic acid having the formula

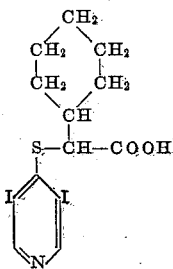

The reaction of delta-bromovaleric acid and 3,5-diiodo-4-pyridinethiol gives delta-(3,5-diiodo-4-pyridylmercapto)valeric acid having the formula

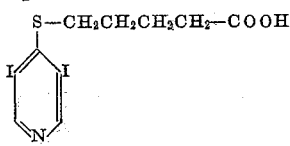

EXAMPLE 4

*Ortho-(3,5-diiodo-4-pyridylmercapto)benzoic acid*

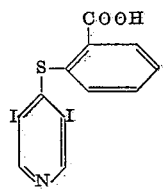

Sodium (2.3 g.) was dissolved in 500 cc. of absolute ethanol, and 7.6 g. of thiosalicylic acid was added followed by 18 g. of 3,5-diiodo-4-chloropyridine (M. P. 170–175°, was prepared from 3,5-diiodo-4-pyridone, phosphorus oxychloride and phosphorus pentachloride). The resulting cloudy solution was refluxed for about fifteen hours, concentrated in vacuo, and the residue was treated with hot dilute sodium hydroxide solution. The hot suspension was filtered while hot to remove insoluble material (A), and when the filtrate was cooled additional solid material (B) appeared.

The solid (A) upon being recrystallized twice from 95% ethanol proved to be 3,5-diiodo-4-ethoxypyridine, M. P. 56.5–57.5° C.

The solid (B) was dissolved in 95% ethyl alcohol and acidified with dilute hydrochloric acid to give 4.7 g. of a greenish-yellow solid, M. P. 245° C. Four grams of this material was dissolved in 250 ml. of absolute ethyl alcohol containing an excess of piperidine, cooled, filtered, and dried at room temperature and 0.5 mm. for four hours to give 3.6 g. of the piperidine salt of ortho-(3,5-diiodo-4-pyridylmercapto)benzoic acid, as white needles, M. P. 226.5–228° C.

Anal. calcd. for $C_{17}H_{18}O_2N_2I_2S$: I, 44.67; C, 35.9; H, 3.17; N, 4.93. Found: I, 43.80; C, 35.60; H, 3.14; N, 4.97.

The filtrate from the solid material (B) was acidified with dilute hydrochloric acid to give an acid precipitate which was recrystallized from 95% ethanol and filtered hot to give a crystalline solid (C). A fourth product (D) was obtained by addition of water to the alcoholic filtrate and cooling.

The solid (C), 2.5 g., was probably 3,5-diiodo-4-pyridone.

The solid (D), 1.5 g., was converted to its piperidine salt by treatment with an alcohol-ether solution containing piperidine. The resulting product when recrystallized from absolute alcohol proved to be the piperidine salt of bis(ortho-carboxybenzene) disulfide, and had the M. P. 211–214° C.

I claim:

1. A member of the group consisting of a compound having the formula

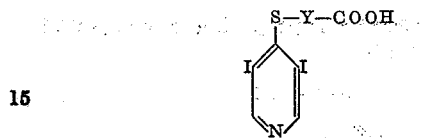

wherein Y is a divalent hydrocarbon radical of from 4 to 7 carbon atoms; and water-soluble non-toxic salts thereof.

2. A compound having the formula

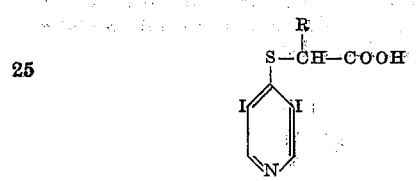

wherein R is a monovalent hydrocarbon radical of from 3 to 6 carbon atoms.

3. A compound having the formula

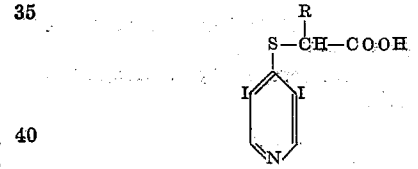

wherein R is an alkyl radical of from 3 to 6 carbon atoms.

4. Alpha - (3,5 - diiodo-4-pyridylmercapto)valeric acid having the formula

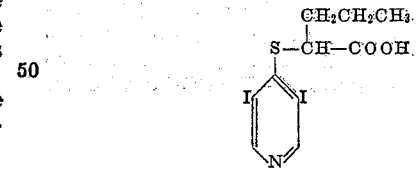

5. Alpha-(3,5-diiodo - 4 - pyridylmercapto)caproic acid having the formula

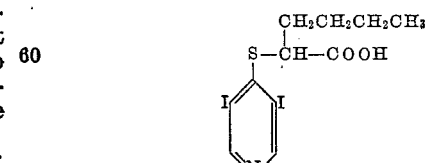

6. Alpha - (3,5 - diiodo - 4 - pyridylmercapto) - isoenanthic acid having the formula

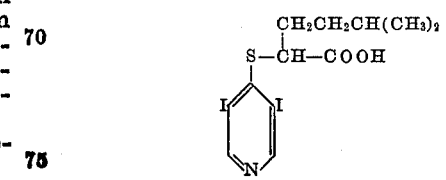

7. Ortho - (3,5-diiodo-4-pyridylmercapto)benzoic acid having the formula

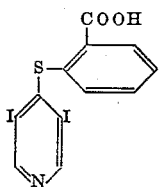

8. In the process for preparing a compound having the formula

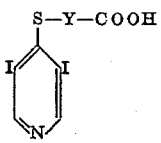

wherein Y is a divalent hydrocarbon radical of from 4 to 7 carbon atoms, the step which comprises reacting under alkaline conditions a compound having the formula

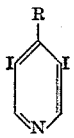

with a compound having the formula

wherein one of R and R' is halogen and the other of R and R' is —SH.

9. In the process for preparing a compound having the formula

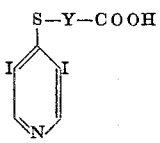

wherein Y is a divalent hydrocarbon radical of from 4 to 7 carbon atoms, the step which comprises reacting under alkaline conditions 3,5-diiodopyridine-4-thiol with a halogenated carboxylic acid of the formula X—Y—COOH wherein X is halogen.

10. In the process for preparing a compound having the formula

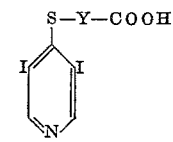

wherein Y is a divalent hydrocarbon radical of from 4 to 7 carbon atoms, the step which comprises reacting under alkaline conditions a 3,5-diiodo-4-halopyridine with a mercapto-carboxylic acid having the formula HS—Y—COOH.

11. In the process for preparing a compound having the formula

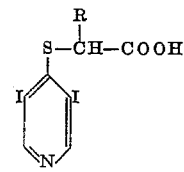

wherein R is an alkyl radical of from 3 to 6 carbon atoms, the step which comprises reacting under alkaline conditions 3,5-diiodopyridine-4-thiol with a halogenated carboxylic acid of the formula X—CH(R)—COOH wherein X is halogen.

12. In the process for preparing alpha-(3,5-diiodo-4-pyridylmercapto)valeric acid, the step which comprises reacting under alkaline conditions 3,5-diiodopyridine-4-thiol with alpha-bromovaleric acid.

13. In the process for preparing alpha-(3,5-diiodo-4-pyridylmercapto)caproic acid, the step which comprises reacting under alkaline conditions 3,5-diiodopyridine-4-thiol with alpha-bromocaproic acid.

14. In the process for preparing alpha-(3,5-diiodo-4-pyridylmercapto)isoenanthic acid the step which comprises reacting under alkaline conditions 3,5-diiodopyridine-4-thiol with alpha-bromoisoenanthic acid.

15. In the process for preparing ortho-(3,5-diiodo-4-pyridylmercapto)benzoic acid, the step which comprises reacting under alkaline conditions 3,5-diiodo-4-chloropyridine with thiosalicylic acid.

SYDNEY ARCHER.

No reference cited.